US008538898B2

(12) United States Patent
Lu et al.

(10) Patent No.: US 8,538,898 B2
(45) Date of Patent: Sep. 17, 2013

(54) INTERACTIVE FRAMEWORK FOR NAME DISAMBIGUATION

(75) Inventors: Zhengdong Lu, Beijing (CN); Zaiqing Nie, Beijing (CN); Gang Luo, Beijing (CN); Yong Cao, Beijing (CN); Ji-Rong Wen, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 317 days.

(21) Appl. No.: 13/118,404

(22) Filed: May 28, 2011

(65) Prior Publication Data
US 2012/0303557 A1 Nov. 29, 2012

(51) Int. Cl.
*G06N 5/00* (2006.01)
(52) U.S. Cl.
USPC .............................................. 706/12; 706/45
(58) Field of Classification Search
USPC ....................................................... 706/12, 45
See application file for complete search history.

(56) References Cited

U.S. PATENT DOCUMENTS

| | | | |
|---|---|---|---|
| 7,685,201 | B2 | 3/2010 | Zeng et al. |
| 2003/0217052 | A1 | 11/2003 | Rubenczyk et al. |
| 2007/0233656 | A1 | 10/2007 | Bunescu et al. |
| 2008/0275859 | A1 | 11/2008 | Griffith |
| 2010/0191683 | A1 | 7/2010 | Nguyen et al. |

OTHER PUBLICATIONS

Nie, et al., Statistical Entity Extraction from Web, Manuscript ID 0094-SIP-2011-PIEEE.R1, 2011, pp. 1-12.*
Huang, et al., "Efficient Name Disambiguation for Large-Scale Databases", Retrieved at <<http://php.scripts.psu.edu/faculty/j/u/juh177/pubs/PKDD2006.pdf>>, In Proceedings of Knowledge Discovery in Databases, vol. 4213, 2006, pp. 536-544.
Han, et al., "Name Disambiguation in Author Citations using a K-way Spectral Clustering Method", Retrieved at <<http://ieeexplore.ieee.org/stamp/stamp.jsp?tp=&arnumber=4118563>>, Proceedings of the 5th ACM/IEEE-CS joint conference on Digital libraries, Jun. 7-11, 2005, pp. 334-343.
Ferreira, et al., "Effective Self-Training Author Name Disambiguation in Scholarly Digital Libraries", Retrieved at <<http://homepages.dcc.ufmg.br/~adrianov/papers/JCDL10/jcdl10.pdf>>, Proceedings of the 10th annual joint conference on Digital libraries, Jun. 21-25, 2010, pp. 10.

(Continued)

*Primary Examiner* — Wilbert L Starks
(74) *Attorney, Agent, or Firm* — Lyon & Harr, LLP; Mark A. Watson

(57) ABSTRACT

A "Name Disambiguator" provides various techniques for implementing an interactive framework for resolving or disambiguating entity names (associated with objects such as publications) for entity searches where two or more same or similar names may refer to different entities. More specifically, the Name Disambiguator uses a combination of user input and automatic models to address the disambiguation problem. In various embodiments, the Name Disambiguator uses a two part process, including: 1) a global SVM trained from large sets of documents or objects in a simulated interactive mode, and 2) further personalization of local SVM models (associated with individual names or groups of names such as, for example, a group of coauthors) derived from the global SVM model. The result of this process is that large sets of documents or objects are rapidly and accurately condensed or clustered into ordered sets by that are organized by entity names.

20 Claims, 5 Drawing Sheets

General System Flow Diagram of the "Name Disambiguator"

(56) References Cited

OTHER PUBLICATIONS

Bollegala, et al., "Extracting Key Phrases to Disambiguate Personal Names on the Web", Retrieved at <<http://www.miv.t.u-tokyo.ac.jp/papers/danu2006a.pdf>>, In Proceedings of CICLing, 2006, pp. 12.
Gao, et al., "Utilizing User-input Contextual Terms for Query Disambiguation", Retrieved at <<http://www.aclweb.org/anthology/C/C10/C10-2038.pdf>>, Proceedings of the 23rd International Conference on Computational Linguistics: Posters, Aug. 2010, pp. 329-337.
Bekkerman, et al., "Interactive Clustering of Text Collections According to a User-Specified Criterion", Retrieved at <<http://www.aaai.org/Papers/IJCAI/2007/IJCAI07-109.pdf>>, Proceedings of the 20th international joint conference on Artifical intelligence, 2007, pp. 684-689.
Zhu, et al., "Anddy: A System for Author Name Disambiguation in Digital Library", Proceedings of 15th International Conference on Database Systems for Advanced Applications, vol. 5982, Apr. 1-4, 2010, pp. 444-447.
Zhang, et al., "A Constraint-Based Probabilistic Framework for Name Disambiguation", Proceedings of the sixteenth ACM conference on Conference on information and knowledge management, Nov. 6-8, 2007, pp. 1019-1022.
Bekkerman, et al., "Disambiguating Web Appearances of People in a Social Nework", Retrieved at <<http://wwwconference.org/www2005/cdrom/docs/p463.pdf>>, Proceedings of the 14th international conference on World Wide Web, May 10-14, 2005, pp. 463-470.
Bhattacharya, et al., "Collective Entity Resolution in Relational Data", Retrieved at <<http://linqs.cs.umd.edu/basilic/web/Publications/2007/bhattacharya:tkdd07/bhattacharya-tkdd.pdf>>, ACM Transactions on Knowledge Discovery from Data (TKDD), vol. 1, Issue 1, Mar. 1, 2007, pp. 1-35.
Bunescu, et al., "Using Encyclopedic Knowledge for Named Entity Disambiguation", Retrieved at <<http://acl.ldc.upenn.edu/E/E06/E06-1002.pdf>>, In Proceedings of the 11th Conference of the European Chapter of the Association for Computational Linguistics (EACL), 2006, pp. 9-16.
Chao, et al., "Word Sense Disambiguation of Adjectives Using Probabilistic Networks", Retrieved at <<http://acl.ldc.upenn.edu/C/C00/C00-1023.pdf>>, Proceedings of the 18th conference on Computational linguistics, vol. 1, 2000, pp. 152-158.
Chen, et al., "Towards Robust Unsupervised Personal Name Disambiguation", Retrieved at <<http://acl.ldc.upenn.edu/D/D07/D07-1020.pdf>>, In Proceedings of the 2007 Joint Conference on Empirical Methods in Natural Language Processing and Computational Natural Language Learning (EMNLP-CoNLL), Jun. 2007, pp. 190-198.
Han, et al., "Two Supervised Learning Approaches for Name Disambiguation in Author Citations", Retrieved at <<http://clgiles.ist.psu.edu/papers/JCDL-2004-author-disambiguation.pdf>>, Proceedings of the 4th ACM/IEEE-CS joint conference on Digital libraries, Jun. 7-11, 2004, pp. 296-305.
Lavrenko, et al., "Relevance-based Language Models", Retrieved at <<http://ciir-publications.cs.umass.edu/pdf/IR-225.pdf>>, Proceedings of the 24th annual international ACM SIGIR conference on Research and development in information retrieval, Sep. 9-12, 2001, pp. 8.
Liu, et al., "Letor Benchmark Dataset for Research on Learning to Rank for Information Retrieval", Retrieved at <<http://research.microsoft.com/en-us/um/people/taoqin/papers/qin-LR4IR.pdf>>, In Proceedings of SIGIR 2007 Workshop on Learning to Rank for Information Retrieval, 2007, pp. 3-10.
Lv, et al., "Adaptive Relevance Feedback in Information Retrieval", Retrieved at <<http://sifaka.cs.uiuc.edu/~ylv2/pub/cikm09-adptfb.pdf>>, Proceeding of the 18th ACM conference on Information and knowledge management, Nov. 2-6, 2009, pp. 10.
Minkov, et al., "Contextual Search and Name Disambiguation in Email Using Graphs", Retrieved at <<http://www.cs.cmu.edu/~einat/sigir-06.pdf>>, Proceedings of the 29th annual international ACM SIGIR conference on Research and development in information retrieval, Aug. 6-11, 2006, pp. 8.
Nie, et al., "Object-Level Vertical Search", Retrieved at <<http://research.microsoft.com/en-us/um/people/znie/cidr2007-nie.pdf>>, Proceedings of the Third Biennial Conference on Innovative Data Systems Research, Jan. 7-10, 2007, pp. 12.
On, et al., "Comparative Study of Name Disambiguation Problem using a Scalable Blocking-Based Framework", Retrieved at <<http://pike.psu.edu/publications/jcdl05.pdf>>, Proceedings of the 5th ACM/IEEE-CS joint conference on Digital libraries, Jun. 7-11, 2005, pp. 10.
Ruthven, et al., "A Survey on the use of Relevance Feedback for Information Access Systems", Retrieved at <<http://strathprints.strath.ac.uk/2457/1/strathprints002457.pdf>>, The Knowledge Engineering Review, vol. 18, Issue 2, Jun., 2003, pp. 54.
Wan, et al., "Person Resolution in Person Search Results: WebHawk", Retrieved at <<http://research.microsoft.com/en-us/um/people/jfgao/paper/cf440-wan.pdf>>, Proceedings of the 14th ACM international conference on Information and knowledge management, Oct. 31-Nov. 4, 2005, pp. 8.
Wang, et al., "Name Disambiguation using Atomic Clusters", Retrieved at <<http://ieeexplore.ieee.org/stamp/stamp.jsp?tp=&arnumber=4597035>>, Proceedings of the 2008 The Ninth International Conference on Web-Age Information Management, Jul. 20-22, 2008, pp. 357-364.
Yoo, et al., "Pseudo-Relevance Feedback in Web Information Retrieval using Segments' Subjective Importance Values", Retrieved at <<http://ieeexplore.ieee.org/stamp/stamp.jsp?tp=&arnumber=1517884>>, Proceedings of the 2005 IEEE/WIC/ACM International Conference on Web Intelligence, Sep. 19-22, 2005, pp. 4.
Yoshida, et al., "Person Name Disambiguation by Bootstrapping", Retrieved at <<http://159.108.48.12/proceedings/sigir/sigir2010/docs/p10.pdf>>, Proceeding of the 33rd international ACM SIGIR conference on Research and development in information retrieval, Jul. 19-23, 2010, pp. 10-17.
Yu, et al., "Improving Pseudo-Relevance Feedback in Web Information Retrieval using Web Page Segmentation", Retrieved at <<http://research.microsoft.com/en-us/um/people/jrwen/jrwen_files/publications/PS-WWW2003.pdf>>, Proceedings of the 12th international conference on World Wide Web, May 20-24, 2003, pp. 8.
Zhang, et al., "Gene Selection using Support Vector Machines with Non-convex Penalty", Retrieved at <<http://bioinformatics.oxfordjournals.org/content/22/1/88.full.pdf+html>>, Journal Bioinformatics vol. 22, Issue 1, Jan. 1, 2006, pp. 88-95.
Zhang, et al., "Interactive Retrieval Based on Faceted Feedback", Retrieved at <<http://users.soe.ucsc.edu/~yiz/papers/c23-sigir10.pdf>>, Proceeding of the 33rd international ACM SIGIR conference on Research and development in information retrieval, Jul. 19-23, 2010, pp. 8.
Zhang, et al., "Author Name Disambiguation for Citations on the Deep Web", Proceedings of the 2010 international conference on Web-age information management, vol. 6185, 2010, pp. 198-209.

* cited by examiner

INTERACTIVE FRAMEWORK FOR NAME DISAMBIGUATION

BACKGROUND

1. Technical Field

A "Name Disambiguator" provides various techniques for implementing an interactive framework for resolving or disambiguating entity names for entity searches where two or more same or similar names may refer to different entities.

2. Background Art

Entity searches (e.g., names of specific people, places, businesses, etc.) are becoming more and more common on the Internet as increasing numbers of people around the world search for specific entities and information relating to those entities. Unfortunately, name ambiguity in both publications and web pages is a problem that affects the quality of entity searches.

In general, two types of name ambiguities are considered. The first type of name ambiguity is where the same name string refers to different entities in the real world, due to the fact that many people share the same name. For example, "Lei Zhang" can refer to a researcher from Microsoft® Research Asia, or a different person from IBM® research having the exact same name. The second type of name ambiguity is that different name strings refer to the same person, because of the name abbreviation, pseudonyms, the use or omission of middle names or initials, etc. For example, "Michael I. Jordan" also appears as "Michael Jordan" in many web pages or publications and both of them refer to a professor at UC Berkeley. This particular name ambiguity problem is further complicated by the fact that "Michael Jordan" also refers to a famous basketball player (i.e., the first type of name ambiguity noted above).

While a number of conventional schemes have been implemented in an attempt to address the disambiguation problem, there has been only limited success in this field. In fact, it has been observed that no known digital library of significant scope can provide a completely correct publication list for every researcher. For example, many publication lists contain papers of multiple researchers who have the same or similar name. Name ambiguities have an even worse effect on searching generic web pages. For example, when a web search "Lei Zhang" is performed on a typical search engine, that search engine will typically return a very large number of web pages which refer to hundreds different persons. Consequently, the user is left to struggle to think up additional keywords to refine the results, which are usually still not satisfactory.

Examples of fully automated conventional models that have been used in various attempts to solve the disambiguation problem include the use of Bayesian networks, support vector machines (SVM), affinity propagation, Markov Random Fields (MRF), etc. Unfortunately, no known fully automated models can achieve near 100% accuracy in each case because the variations of the names are too complicated. Consequently, it can be said that the previous work has proved that a single fully automated model fails to leverage all aspects and address all cases to provide name disambiguation at or near 100% accuracy.

More specifically, various attempts have been made to solve the name disambiguation problem for specific areas of interest, such as web names, authors of citations, names in email, etc. Most conventional schemes have been enacted by formalizing the name disambiguation task as a clustering problem that uses fully automatic models. For example, one such technique for author name disambiguation clusters documents into atomic groups in a first step and then merges the groups. It was observed that the use of atomic groups helped the performance of existing clustering-based methods. Another such technique uses a similar two stage clustering, where the first stage uses "strong features" such as compound key words and entity names to cluster web pages. These results were then further clustered in the second stage using "weak features" such as publication topics. Unfortunately, both of these two stage schemes use automatic models that do not control the quality of the results in the first stage, thereby degrading the quality of the final results.

In fact, a comparative study of many existing 2-stage clustering methods was conducted that primarily compared different distance measures with various conventional supervised and unsupervised clustering methods. One such method evaluated by the study applied two supervised models, a naive Bayes model and support vector machines, to solve the disambiguation problem. Another studied method used two unsupervised frameworks for solving the disambiguation problem, where one framework was based on the link structure of Web pages and the second framework used agglomerative/conglomerative double clustering. Unfortunately, as noted above, such schemes use automatic models that do not control the quality of the results in the first stage, thereby degrading the quality of the final results.

Several conventional schemes have also focused on using external data in an attempt to solve or improve the name disambiguation problem. For example, one such scheme made use of Wikipedia® pages associated with particular authors or topics to disambiguate named entities. This scheme extracted "features" from Wikipedia® for use in a supervised learning process. Unfortunately, since not every author entity is covered by a Wikipedia® page or other Internet source, such schemes cannot guarantee accuracy for disambiguating the names of all authors or other entities.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

In general, a "Name Disambiguator," as described herein, provides an interactive framework combined with a semi-automatic model to iteratively name or entity disambiguation problems. This framework is implemented in various embodiments wherein limited human input is combined with automatically learned models to improve the performance of the automatically learned models to provide name disambiguation at or very near 100% accuracy.

More specifically, the Name Disambiguator provides an interactive framework to help users solve the name disambiguation problem using a combination of user input and automatic models constructed in part based on "features" associated with the objects being evaluated, such as publications by one or more authors. For example, in the case of publications, these "features" include, for example, an author name list, email addresses, homepages of the authors or other internet addresses, reference lists, citations, conference name at which a publication was presented or published, title, abstract, download URLs, publisher name, etc. In other words, these features represent a form of metadata that is mined or extracted from each object. Further, it should be noted that features are not necessarily consistent from object to object, and that some objects may have more or fewer features than other objects.

In various embodiments, the Name Disambiguator uses an interactive support vector machine (SVM) framework for re-ranking. This interactive SVM includes two parts: 1) a global SVM trained in a simulated interactive mode, and 2) further personalization of local SVM models (associated with individual names or groups of names such as, for example, a group of coauthors) derived from the global SVM model during user interaction with the resulting models. However, it should be understood that while the following discussion generally assumes the use of an SVM type algorithm that incorporates limited human interaction to solve the name disambiguation problem, other learning algorithms may also be adapted to incorporate the human interaction techniques described herein to solve the name disambiguation problem.

For example, instead of an SVM framework, in various embodiments, the Name Disambiguator is implemented using automatic models such as logistic regression, neural networks, boosting algorithms (e.g., AdaBoost and its online variants), Markov Random Fields (MRF), etc. As with embodiments where SVM algorithms are used to implement the Name Disambiguator, in cases where algorithms other than SVM are used, online versions of those algorithms are adapted to construct a personalized re-ranker for each entity (e.g., author names) in a second phase of training and testing.

In the case of SVM, the "interactive SVM" model used by the Name Disambiguator differs from traditional SVM in at least two ways: 1) the "interactive SVM" described herein provides a population-level SVM model (also referred to herein as a "global model") that is trained in an interactive setting; and 2) further personalization of the global model is performed during true human-computer interaction to construct entity-level re-rankers (i.e., a separate personalized SVM model for each entity, also referred to herein "local models").

In implementing this functionality, a concept defined as "Maximum Recognition Units" (MRU) is introduced to denote unambiguous knowledge units that are generated by fully-automated algorithms (SVM, logistic regression, boosting, etc.). The aforementioned interactive framework is then used to re-rank the knowledge units (MRUs) during the user interaction process. More specifically, a ranked list of MRUs is presented to the user in response to a user query or search for a particular author. The user then selects one or more of the MRUs in that ranked list that actually correspond to the queried author. User selections are then used, in combination with various predefined feature-based rules, to merge one or more MRUs and as personalization information for refining or updating the local SVM models. This loop of user input or selection of re-ranked MRUs, MRU merging, and retraining the local SVM models then continues for as long as the user desires to continue providing input, or until no further MRU merges are possible. In various embodiments, the Name Disambiguator is further enhanced to reduce user input by using one or more extensions, including, but not limited to: 1) "personalized SVM"; 2) "similarity propagation"; and 3) merging MRUs after each interactive process, as discussed in further detail herein.

Based in part on these elements, various tested embodiments of the Name Disambiguator have demonstrated the capability to efficiently leverage interactive human knowledge and inputs in combination with various automated learning processes or models to significantly reduce the time and number of user clicks to build high quality publication lists for particular authors. Note that it should be clear that name (or entity) disambiguation can be used for a variety of purposes, and that building publication lists for particular authors is simply one example of the how the Name Disambiguator described herein may be used.

In view of the above summary, it is clear that the Name Disambiguator described herein provides various techniques for implementing an interactive framework for resolving or disambiguating entity names for entity searches where two or more same or similar names potentially, though not necessarily, refer to different entities. In addition to the just described benefits, other advantages of the Name Disambiguator will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In general, a "Name Disambiguator," as described herein, provides an interactive framework constructed to solve the name disambiguation problem with close to 100% accuracy. Note that for purposes of explanation and example, the following discussion will generally describe the use of various embodiments of the Name Disambiguator framework to implement an interactive system for solving the problem of academic author disambiguation in a manner that allows users to easily create and manage author-based publication lists. However, it should be understood that name (or entity)

disambiguation can be used for a variety of purposes, and that building publication lists for particular authors is simply one example of the how the Name Disambiguator described herein may be used.

Note also that in implementing and describing various embodiments of the Name Disambiguator, a "Maximum Recognition Unit" (MRU) is defined as a set of unambiguous knowledge units (e.g., entity/object pairs) that are generated by fully-automated algorithms (SVM, logistic regression, boosting, etc.). For example, in the context of author name disambiguation for publications, each individual MRU, M, is a group of papers or publications, $P_M$, having an author, $A_M$, where $A_M$ corresponds to one specific author and all the papers in M are determined to have been written by $A_M$ (and potentially one or more co-authors) with 100% accuracy (i.e., unambiguous authorship for each publication in the MRU). In other words, in this example, the entity/object pairs of each MRU are author/publication pairs for one specific author (with or without one or more coauthors).

Figure 1:
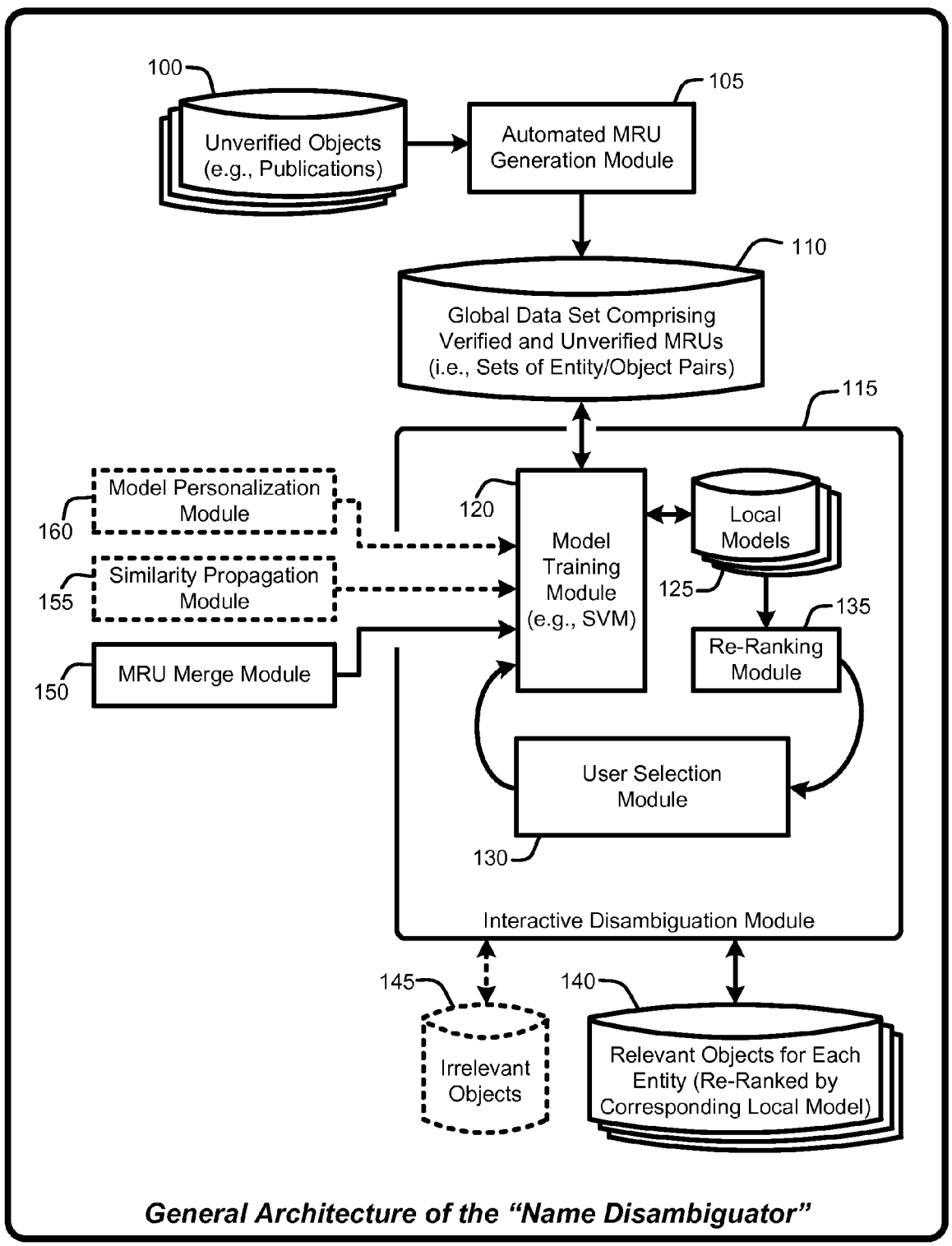
FIG. 1 provides an exemplary architectural flow diagram that illustrates program modules for implementing various embodiments of the Name Disambiguator, as described herein.

1.1 System Overview:

As noted above, the "Name Disambiguator," provides various techniques for implementing an interactive framework for resolving or disambiguating entity names for entity searches where two or more same or similar names potentially, though not necessarily, refer to different entities. The processes summarized above are illustrated by the general system diagram of FIG. 1. In particular, the system diagram of FIG. 1 illustrates the interrelationships between program modules for implementing various embodiments of the Name Disambiguator, as described herein. Furthermore, while the system diagram of FIG. 1 illustrates a high-level view of various embodiments of the Name Disambiguator, FIG. 1 is not intended to provide an exhaustive or complete illustration of every possible embodiment of the Name Disambiguator as described throughout this document.

In addition, it should be noted that any boxes and interconnections between boxes that may be represented by broken or dashed lines in FIG. 1 represent alternate embodiments of the Name Disambiguator described herein, and that any or all of these alternate embodiments, as described below, may be used in combination with other alternate embodiments that are described throughout this document.

In general, as illustrated by FIG. 1, the processes enabled by the Name Disambiguator begin operation by receiving one or more sets of unverified objects 100 (e.g., publications in the case of author name disambiguation). These unverified objects 100 are provided to an automated MRU generation module 105 that uses SVM (or other automated learning model) to cluster the unverified objects 100 (e.g. publications) into a set of MRUs, each MRU having one or more publications.

More specifically, the automated MRU generation module clusters the unverified objects 100 into a global data set 110 comprising both "verified MRUs" and "unverified MRUs". As discussed in further detail below, verified MRUs have accurately known authors (i.e., accurately known entity/object pairs), while for unverified MRUs, the accuracy of authorship is not known with sufficient reliability to be considered verified. Following the initial clustering by the automated MRU generation module 105, the global data set 110 is provided to an interactive disambiguation module 115.

In general, interactive disambiguation module 115 implements the second stage of the general two-stage disambiguation process performed by the Name Disambiguator. This second stage is a circular interactive stage, including a re-ranking model and user selection process that is used to merge either or both unverified MRUs and verified MRUs into other already verified MRUs via a process that includes user input regarding ranked MRUs presented to the user in response to a user query or search for a particular author. Updating or merging of the MRUs is based on that input and other fixed merging rules, followed by further SVM training based on "features" of the newly merged MRUs, weight and bias computations based on the retrained or updated SVMs (for the global data 110 and local models 125), and re-ranking and presentation of results (MRUs) to the user for one or more additional iterations of user input, merging, training, and re-ranking.

In the case of publications, these "features" include, for example, an author name list, email addresses, homepages of the authors or other internet addresses, reference lists, citations, conference name at which a publication was presented or published, title, abstract, download URLs, publisher name, etc. In other words, these features represent a form of metadata that is mined or extracted from each object. Further, it should be noted that features are not necessarily consistent from object to object, and that some objects may have more or fewer features than other objects.

More specifically, within the interactive disambiguation module 115, a model training module 120 receives the global data set 110, which is then processed in the circular loop of the interactive disambiguation module to merge the MRUs. Specifically, this circular iterative process begins by using the model training module 120 to learn local models 125 for each entity (e.g., author) from the global data set 110 using SVM (or other model types, as discussed in further detail herein) and to merge MRUs (using an MRU merge module 150) based on "features" extracted from the MRUs. These features are then also used a re-ranking module 135 to rank the MRUs for user selection (for MRU merging purposes) via a user selection module 130.

Since MRU merges are based, in part on features extracted from MRUs, every time that the user provides input that allows another MRU merge, additional features may be extracted from the newly merged MRU that allows that MRU to be automatically merged with one or more MRUs (based on the fixed merging rules discussed in detail below). In general, the re-ranking module ranks MRUs that are similar to user selected records (e.g., entity or author names) to at or near the top of a ranked list presented to the user for user selection via the user selection module 130. The user can then select any MRU in that ranked list that that corresponds to the author or entity being searched or queried by the user.

Following this selection, the model training module merges the corresponding MRUs and uses whatever information was provided by the user (and by the merge) to refine the local models 125. This iterative process then loops for as long as the user wants to continue providing input for one or more specific entities or authors (for MRU merging purposes). Note that as this merging process continues, the number of both unverified and verified MRUs will tend to decrease, though the verified MRUs will grow in size as the merges progress (e.g., more publications in the verified MRUs). The end result of this process is a set of verified MRUs having very high accuracy relative to the corresponding authors (or other entities). In various embodiments, model training and MRU merging is enhanced via a model personalization module 160 and/or a similarity propagation module that further improves MRU merge operations, as discussed in further detail below.

Once user input is complete or finished, the interactive disambiguation module 115 can then output lists of relevant objects 140 for each entity. Further, a set of irrelevant objects 145, not corresponding to any known or identifiable author or entity may also be output by the interactive disambiguation module 115. However, as more users provide additional input over time, it is expected that the number of irrelevant objects 145 will decrease, or even be eliminated via MRU merges that associated objects with the proper entity (e.g., associate publications with their proper authors).

2.0 Operational Details of the Name Disambiguator:

The above-described program modules are employed for implementing various embodiments of the Name Disambiguator. As summarized above, the Name Disambiguator provides various techniques for implementing an interactive framework for resolving or disambiguating entity names for searches where two or more same or similar names may refer to different entities. The following sections provide a detailed discussion of the operation of various embodiments of the Name Disambiguator, and of exemplary methods for implementing the program modules described in Section 1 with respect to FIG. 1. In particular, the following sections provides examples and operational details of various embodiments of the Name Disambiguator, including: an exemplary system for author name disambiguation for creating publication lists; maximum recognition unit (MRU) generation and merging models; and re-ranking with interactive models such as interactive SVM.

2.1 Interactive Author Name Disambiguation for Publication Lists:

As noted above, the Name Disambiguator-based processes described herein provide various techniques for implementing an interactive framework for resolving or disambiguating entity names for entity searches where two or more same or similar names potentially, though not necessarily, refer to different entities. The following paragraphs will generally describe these capabilities in terms of a system for providing interactive author name disambiguation for use in constructing highly accurate publication lists. However, as noted above, it should be understood that name disambiguation for use in constructing publication lists is simply one of many possible uses for the Name Disambiguator described herein.

More specifically, the problem of author name disambiguation for publications can be formalized as follows: Given a set of publications, $P=\{p_1, p_2, \ldots, p_{|P|}\}$, find a subset $P_A$ of P such that all publications in $P_A$ are written by author A, while none of the other publications in $P'=P-P_A$ are written by that author. During the interactive process, users are prompted to provide relevance information for one or more of the publications to help train the overall system. However, it is also useful to limit user input to as few interactions as possible (also referred to herein as "reducing the users' cost", or similar language). Each publication p has various "features", such as, for example, an author name list, email addresses, homepages of the authors or other internet addresses, reference lists, citations, conference name at which a publication was presented or published, title, abstract, download URLs, publisher name, etc. However, it should be understood that due to both limitations in extraction techniques, and to the information in the publications themselves, not every feature has a determinable value (or even exists) for each publication.

2.2 Maximum Recognition Unit (MRU) Generation and Merging:

As noted above, the name disambiguation process is approached as a multi-stage operation that begins by constructing Maximum Recognition Units (MRUs) from one or more large database of publications. MRUs serve as atomic units in the overall interactive name disambiguation process. Operations on MRUs include the unsupervised generation of MRUs and the potential merge of MRUs during user interaction. Note that the generation and merging of MRUs follow similar rules, as discussed below, though during user interaction, verified MRUs might grow via merging of MRUs, depending on the user input received.

More specifically, in the first stage, the Name Disambiguator groups the publications into one or more MRUs. As noted above, an MRU, M, is defined as a set of unambiguous knowledge units (e.g., entity/object pairs) that are generated by fully-automated algorithms (SVM, logistic regression, boosting, etc.). For example, in the context of author name disambiguation for publications, each individual MRU, M, is a group of papers or publications, $P_M$, having an author, $A_M$, where $A_M$ corresponds to one specific author and all the papers in M are determined to have been written by $A_M$ (and potentially one or more co-authors) with 100% accuracy (i.e., unambiguous authorship for each publication in the MRU). For this example, the entity/object pairs of each MRU are author/publication pairs for one specific author (with or without one or more coauthors). Further, it should be noted that every paper or publication is initially assigned to an MRU during this process, though some of these publications may be the only object in an MRU. Consequently, after the first stage of grouping, all of the remaining algorithms and approaches implemented by the Name Disambiguator are based on these MRUs.

In general, all papers or publications in each particular MRU are treated as one extended paper or publication, and the "features" of each MRU are the union of the corresponding features of all of the individual papers or publications comprising that MRU. Consequently, any particular MRU may have more features than any of the individual papers or publications comprising that MRU. As discussed below, to measure the similarities between two MRUs, the Name Disambiguator uses some or all of the following features extracted from each MRU: coauthor, two-order coauthor, download URL domain, reference and citation, publisher, title and abstract. However, it should be understood that other features (e.g., address, source, type, size, date, etc.) associated with the objects (e.g., papers and publications) may also be used to implement various embodiments of the Name Disambiguator, depending upon the particular types of objects being processed by the Name Disambiguator.

2.2.1 MRU Generation Model:

As noted above, the first stage of the overall framework is to generate a set of MRUs that belong to the specific authors. In general, this process begins by determining a set of name strings, $N_s=\{s_1, s_2, \ldots, s_{|N_s|}\}$, for each author name, s, e.g., "Lei Zhang", that are similar to s. Therefore, the publications written by an author whose name is in $N_s$ may or may not be written by a single author, $\alpha$. Consequently, this initial set of similar names is used as an initial input for MRU construction.

In particular, given the initial sets of similar names, the Name Disambiguator retrieves all publications having an author name in $N_s$ and applies the merge algorithm described in Section 2.2.2 to generate MRUs. However, since the Name Disambiguator operates based in part on the premise of accuracy in the MRUs, MRU merging uses a strict rule-based methodology rather than probabilistic models or other classifiers. Consequently, the rules are designed to prevent the introduction of errors into the MRUs. In contrast, the use of probabilistic models or other classifiers would inherently introduce probabilistic levels of errors into the MRUs.

For example, the following MRU generation rules ($Gen_1$, $Gen_2$, and $Gen_3$) were used in various embodiments of the Name Disambiguator. However, it should be noted that the following rules are specific to the case of author names and corresponding publications, and that other rules may be used depending upon the types of objects and entities being considered for purposes of name disambiguation.

Rule $Gen_1$, Email: All publications having an author name in $N_s$ that have the same email address are clustered or merged into one MRU (i.e., objects having similar entity names that also have the same email address as a feature are merged into the same MRU).

Rule $Gen_2$, Homepage: All publications having an author name in $N_s$ that have the same homepage (or Internet) address are clustered or merged into one MRU (i.e., objects having similar entity names that also have the same homepage address as a feature are merged into the same MRU).

Rule $Gen_3$, Two Coauthors: All publications that share two common coauthors (where the name strings are the same or where two separate name strings have been verified to refer to the same author) are clustered or merged into the one MRU (i.e., objects sharing two common entity names are merged into the same MRU). Note that, intuitively, different names indicate different strengths of links between publications. Generally, it has been observed that unusual or uncommon names indicate a strong link between publications while common names indicate a weak link (since common names are more likely to refer to different authors of the same name). From this observation, the following two cases indicate weaker evidence of the link between two publications:

1) Coauthors of a particular person are more likely to form a "community" since many authors often collaborate with the same coauthors on different publications. Therefore, the number of connected groups of coauthors approximately reflects how many distinct authors have a particular name. If the coauthors form a large number of groups, it is likely that the related author name is a more ambiguous one, meaning that it is more likely that the same name in two different publications refer to different authors. Therefore, in this case, the link is weaker.
2) A name associated with a large number of publications or papers and small ambiguity may also indicate a weak link. In particular, in such cases, that name often refers to a senior and/or famous researcher or author that has written a large number of publications that are more likely to have been coauthored with two people having the same name.

The above described rules and considerations are used to measure the ambiguity of a name string. The Name Disambiguator looks for strong links to ensure high purity or accuracy of each MRU. Consequently, the Name Disambiguator uses a high threshold for the ambiguity of common coauthors to ensure that all MRUs have at or very near 100% accuracy. The result of the above-described process is a set of verified MRUs having accurately known authors, and a set of unverified MRUs, wherein accuracy of the authorship of MRUs is not known with sufficient reliability to be considered verified.

2.2.2 MRU Merging:

MRU merging takes place across multiple iterations that may or may not include user input. However, as noted above, the feature set of each verified MRU is the union of the corresponding features of all of the individual papers or publications comprising that MRU. Therefore, after each iteration where MRUs are merged, there is more information from the publications in each such MRU. This allows the Name Disambiguator to automatically merge some unverified MRUs into the verified MRU, thereby further reducing the number of any unverified MRUs that may require user input to rectify. Consequently, this automated merging decreases any user input or time provided by the user. Again, as with initial MRU construction, a rule-based methodology in combination with high thresholds, rather than probabilistic methods or other classifiers, is used to ensure that merged MRUs have at or very near 100% accuracy.

For example, the following MRU merging rules ($Mrg_1$, and $Mrg_2$) were used in various embodiments of the Name Disambiguator. However, it should be noted that the following rules are specific to the case of author names and corresponding publications, and that other rules may be used depending upon the types of objects and entities being considered for purposes of name disambiguation. Note also the similarity to the MRU generation rules described above.

Figure 2:
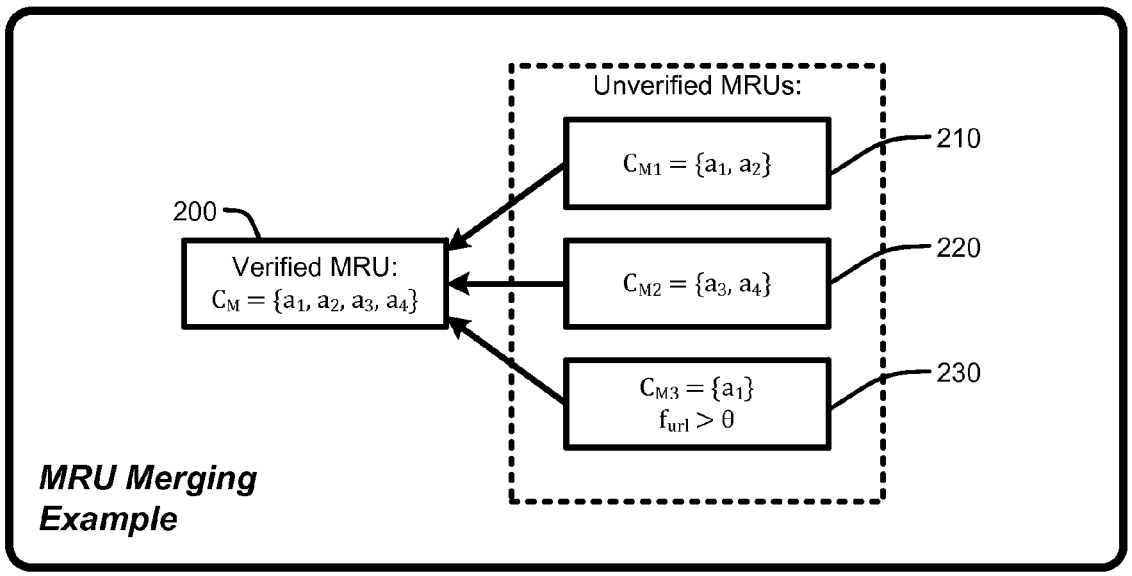
FIG. 2 provides an example of MRU merging, as described herein

Rule $Mrg_1$, Two Coauthors: If an unverified MRU contains two coauthor names which appear in a verified MRU, it is merged with that verified MRU. As shown in FIG. 2, MRUs $M_1$ 210 and $M_2$ 220 can be automatically merged because they each have two common coauthors (i.e., $a_1, a_2$ and $a_3, a_4$, respectively) with verified MRU 200 (i.e., $a_1, a_2, a_3, a_4$). Note that in various embodiments, there is also a threshold for the ambiguity of the coauthor names. As noted above, different names have different levels of ambiguity represented by the strength of evidence for the similarity (or distance) between two MRUs. Similarly, with Rule $Mrg_1$, the same ambiguity control is used such that not all the coauthor names will be automatically regarded as a common coauthor. In particular, only those with relatively small ambiguity levels will be considered common coauthors for use in automatically merging two MRUs. Note however, that user input, as discussed below, may still be used to merge two or more MRUs that are not automatically merged based on the stated rules. In the case of user intervention or input, it is assumed that the user is correct in directing the merge.

Rule $Mrg_2$, One Coauthor: If an unverified MRU contains one author name which appears in a verified MRU, the Name Disambiguator will merge that unverified MRU with the verified MRU if other weak features reach a sufficiently high threshold. For example, in a tested embodiment, the Name Disambiguator will merge the unverified MRU if the feature value of URL domain and is greater than some value, $\theta$, as discussed in further detail in the following sections. Note that in various embodiments, $\theta$ is either set as a fixed value, or is user adjustable. Continuing with FIG. 2, unverified MRU $M_3$ 230 will be merged with the verified MRU 200 because its coauthor list contain $a_1$ and its URL domain similarity ($f_{url}$) is greater than $\theta$.

2.3 Re-Ranking with Interactive Models:

The re-ranking model employed by the Name Disambiguator helps to further reduce the need to provide user inputs or selections for merging MRUs. In general, the purpose of the re-ranking model is to rank (i.e., sort) the MRUs such that what the user wants (based on a user search or query for a particular name or author) is at or near the top of a list of ranked or sorted MRUs. In this way, the user will generally look at fewer MRUs and click fewer times to select all of the MRUs that the user is interested in. The following paragraphs introduce an MRU re-ranking algorithm based on a support vector machine (SVM) acting in an interactive mode. However, as noted above, in various embodiments, the Name Disambiguator is implemented using automatic models other than SVM. Such models include, but are not limited to logistic regression, neural networks, boosting algorithms (e.g., AdaBoost and its online variants), Markov Random Fields (MRF), etc. In the case of interactive SVM, the process generally comprises two stages:

1) Stage 1: Training a global SVM in the interactive setting. In this stage, the Name Disambiguator trains an SVM with "global training data" obtained in a simulated interactive setting to construct the aforementioned global data set comprising both verified and unverified MRUs. The learned SVM model is on population level (i.e., all papers or publications being considered), and serves as a starting point for the personalization in later stages.

2) Stage 2: Personalized SVMs for each individual entity.

In this stage, the Name Disambiguator derives or extracts individual SVM models (also referred to herein as "local models") from the global SVM (also referred to herein as a "global model") to cope with the different characteristics of each individual author. In other words, for each author, a separate local model is derived from the global model.

2.3.1 Training the Global SVM in a Simulated Interactive Mode:

As is well known to those skilled in the art, traditional SVM acts in a static supervised mode that assumes all data are sampled from a static distribution of positive and negative classes. In contrast, the re-ranking model of the Name Disambiguator acts in an interactive mode, which differs from the i.i.d. assumption of traditional SVM in the following two senses:

1) The samples are generated in a sequential order; and
2) The generation of positive and negative example depends on the re-ranking model itself.

These two criteria result in circular or co-dependent needs between the training data and the ranking model. In general, the Name Disambiguator first uses a surrogate ranking model obtained manually (also used as baseline) to generate the training data which is in turn used to derive the interactive model. In particular, the samples are generated as illustrated by Equation (1):

$$(x_i, y_i) = \text{feature}(\text{verified MRU}^{(t)}, \text{unverified MRU}_k^{(t)}) \quad \text{Equation (1)}$$

where the function "feature" yields relational features $x_i \in \mathbb{R}^k$, and binary labels $y_i \in \{0,1\}$, and where the pair (verified $\text{MRU}^{(t)}$, unverified $\text{MRU}_k^{(t)}$) are snapshots of the labeling sequence returned by the baseline ranking model and an ideal labeler.

2.3.2 Personalized SVM Model:

As noted above, the personalized SVM model is provided to help improve the ranking results, while minimizing user input. Initially there is a global ranking model for every test case such as the author "Lei Zhang". However, each case may have its own pattern. For example, some authors prefer to use specific words in publication titles or to focus their publications on specific or closely related topics. In such cases, the title and abstract similarity may be more useful for ranking the MRUs for such authors. Considering another example, some authors may coauthor with a small stable group or community of people while others don't have a stable coauthor group. In this case, the coauthor feature may be more useful for the former (i.e., small community of coauthors) than the latter (i.e., no stable coauthor group).

Figure 3:
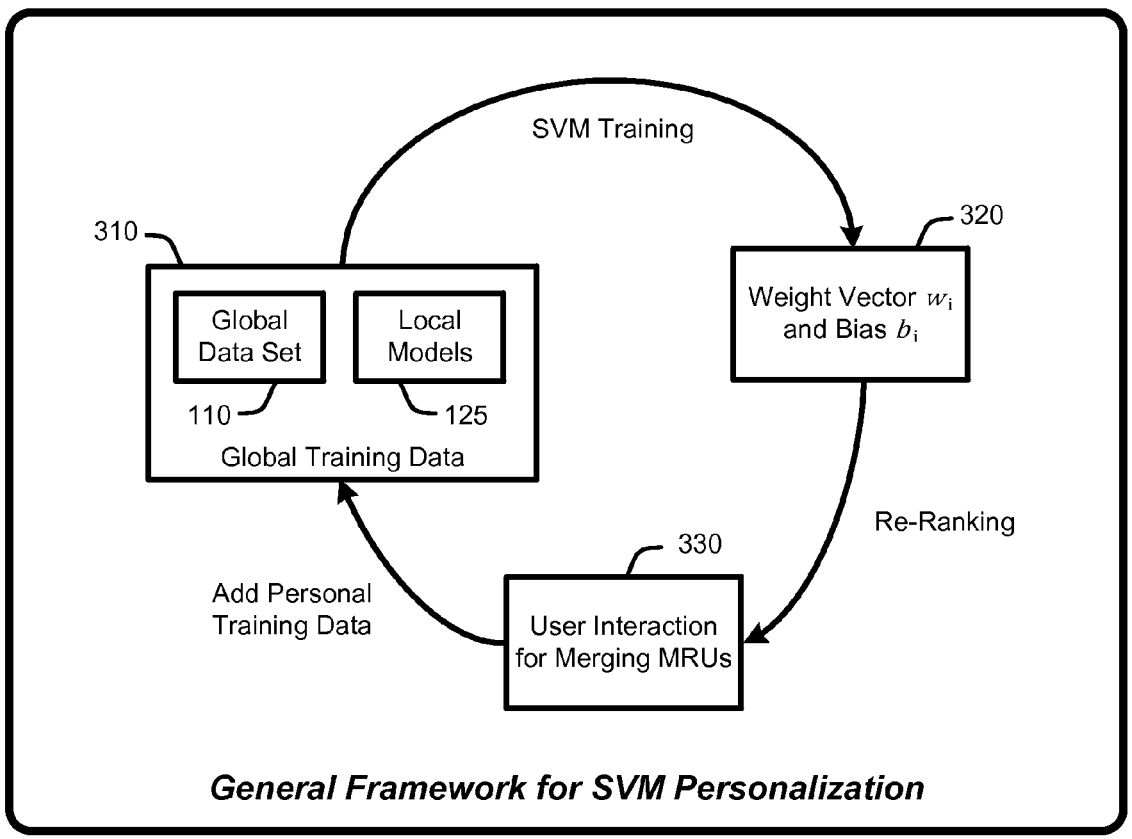
FIG. 3 provides an exemplary general framework for SVM personalization, as described herein FIG. 4 provides an example of a two-order coauthor structure for computing link strength between two objects, as described herein.

To leverage this aspect of publications and authors, the Name Disambiguator implements a personalized SVM model for each author. In general, the personalized SVM model is provided to use the data resulting from previous interactions as the new training data of the next interaction. FIG. 3 shows the general framework of the model. In particular, the Name Disambiguator first uses the aforementioned global data set 310 to learn a global weight vector and bias 320 (i.e., $w_0$ and $b_0$, respectively for the initial global values). At the beginning of this process, the Name Disambiguator uses the global weight vector to rank the MRUs. During user interaction 330, the user provides the Name Disambiguator with the relevance of the MRUs that verified by the user.

This user interaction 330 results in a set of new personal training data that is added to the global training data 310 (comprising the global data set 110 and, after the first personalization iteration, local models 125), which is then used to train new personal SVM models for each author or entity (i.e., local models 125) having a new weight vector and bias (320) (i.e., $w_1$ and $b_1$, following the first personalization iteration). To effectively personalize the data, the Name Disambiguator gives newly acquired data a weight different than the old data. This personalization loop (i.e., elements 310, 320, 330) then continues until the user completes editing the publication list. Through this iterative personalization process, the learned weight vector is gradually adjusted to a pattern that is more similar to a particular author or entity. Moreover, some small noise (i.e., errors) in the personalization data provided by the user will not generally significantly affect the global data so that the model is still robust.

2.3.3 Features:

As noted above, the ranking model of the Name Disambiguator is based on the similarity (i.e., distance) between MRUs. This similarity is determined as a function of the various "features" that are derived or extracted from the MRUs. The following paragraphs describe several features that were used in a tested embodiment of the Name Disambiguator for use in implementing the aforementioned author name disambiguation system. However, it must be understood that other features may be used in place of the features described below, and that the various features available will generally depend upon the information associated with the entities for which name disambiguation is being performed.

2.3.3.1 Coauthor:

In the case of coauthors, the Name Disambiguator uses the expression $C = \{(c_1, n_1), (c_2, n_2), \ldots, (c_{|C|}, n_{|C|})\}$ to denote the coauthor list of an MRU. In this example, $c_i$ is the name of a coauthor and $n_i$ is the number of occurrences of $c_i$ across all of the publications in a particular MRU. For example, suppose that there are two MRUs $M_1$ and $M_2$ and that their coauthor lists are $C_1$ and $C_2$, respectively. Then, the feature value, $f_{Coauthor}$, is given by:

$$f_{Coauthor}(M_1, M_2) = \frac{\sum_{c_i \in C_1, c_j \in C_2} sim(c_i, c_j) \cdot \frac{n_j}{a(c_j)}}{\sum_{c_j \in C_2} n_j} \quad \text{Equation (2)}$$

where $sim(c_i, c_j)$ measures the string similarity (i.e., text similarity) between $c_i$ and $c_j$ and $a(c_j)$ is the ambiguity of $c_j$ discussed above. Note that this function is not symmetric to $M_1$ and $M_2$. This is because the similarity is computed between verified MRUs and unverified MRUs. Verified MRU contains all the papers or publications that were automatically verified during the initial automated MRU generation stage as well as all papers or publications that the user has justified or verified during user selection or validation of MRUs presented to the user (i.e., the aforementioned ranked list of MRUs presented to the user in response to a user query or search for a particular author). Consequently, verified MRUs tend to be much larger than unverified MRUs. Therefore, the similarity between them is relies more heavily on the number of coauthors in an unverified MRU that the verified MRU also contains. Thus, it has been observed that an asymmetric function such as Equation (2) works well for this purpose.

Figure 4:
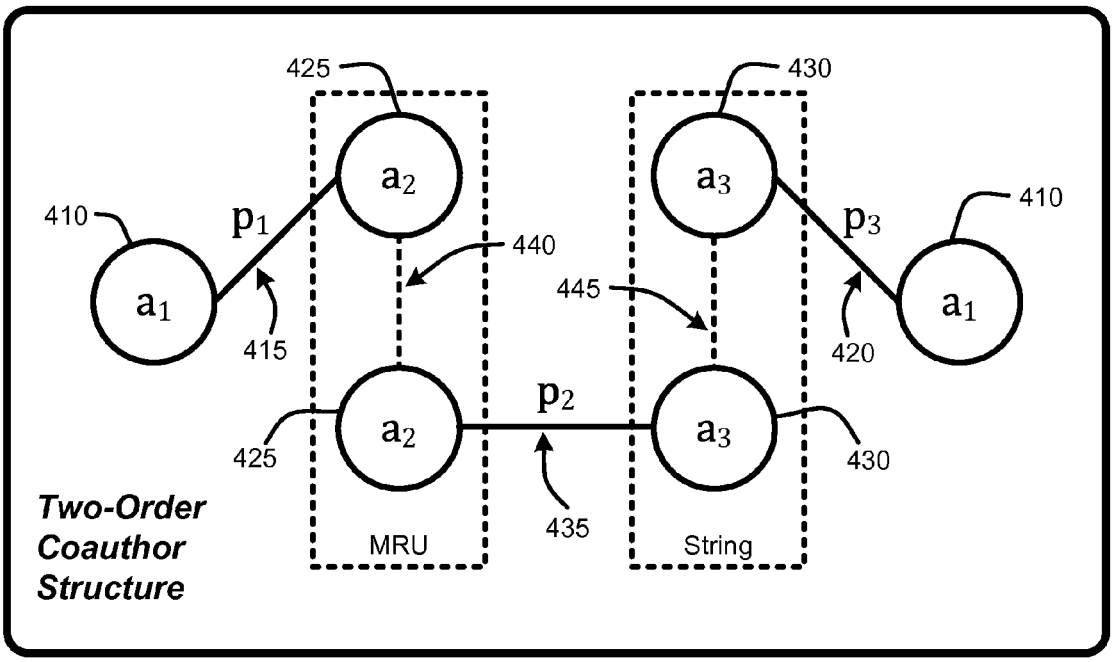

2.3.3.2 Two-Order Coauthor:

In creating a system for author name disambiguation for publications, it has been observed that coauthor information contributes significantly to the construction of correct MRUs. Therefore, to make use of this structural information, the Name Disambiguator evaluates patterns of high-order coauthors. The Name Disambiguator further considers "2-order coauthor" links between two MRUs. The two-order coauthor feature is defined as illustrated by the example of FIG. 4. In particular, this exemplary 2-order coauthor link structure shows the author name $a_1$ 410 in two papers $p_1$ 415 and $p_3$ 420 are connected through two coauthors $a_2$ 425 and $a_3$ 430. Specifically, the two instances $a_1$ (i.e., in papers $p_1$ 415 and $p_3$ 420) are connected through two name strings via a total of three papers (i.e., paper $p_2$ 435 has coauthors $a_2$ 425 and $a_3$ 430). Here the problem is how to constrain the strength of MRU link 440 between the two instances of $a_2$ 425 between $p_1$ 410 and $p_2$ 435, shown as the dotted line. In this example, there are two kinds of links: the MRU link 440 and a string link 445. The MRU link 440 means that $p_1$ and $p_2$ must be in the same MRU as $a_2$ while the string link 445 doesn't have such a constraint. The MRU link 440 is much stronger than the string link 445.

In evaluating various combinations of these links, it has been observed that: 1) If both links between $a_2$ and $a_3$ are MRU based, this feature is too sparse; and 2) If both links are string based, this feature is too noisy. Therefore, to provide an acceptable balance, the Name Disambiguator uses the combination that one of the two links is based on MRU and the other is based on the string, such as the example of FIG. 4.

The 2-order coauthor list for an author $a_1$ is defined as follows: $C^2 = \{(c_1^2, n_1), (c_2^2, n_2), \ldots, (c_{|C|}^2, n_{|C|})\}$ and for any $c_i^2 \in C^2$, there exists an author name $a_2$ and two papers $p_1, p_2$ such that:

1) $p_1$ has the authors $a_1$ (owner of the MRU) and $a_2$;
2) $p_2$ has the authors $a_2$ and $c_i^2$; and
3) $p_1$ and $p_2$ are in the same MRU of $a_2$.

where $n_i$ is the number of appearances of $c_i^2$. In this case, the feature value, $f_{2\text{-}coauthor}$, for the link between MRU $M_1$ and MRU $M_2$ is given by Equation (3):

$$f_{2\text{-}coauthor}(M_1, M_2) = \frac{1}{2} \left[ \frac{\sum\limits_{c_i^2 \in C_1^2, c_j \in C_2} sim(c_i^2, c_j) \cdot \frac{n_j}{a(c_j)}}{\sum\limits_{c_j \in C_2} n_j} + \frac{\sum\limits_{c_i \in C_1, c_j^2 \in C_2^2} sim(c_i, c_j^2) \cdot \frac{n_j}{a(c_j^2)}}{\sum\limits_{c_j^2 \in C_2^2} n_j} \right] \quad \text{Equation (3)}$$

where $sim(c_i, c_j)$ and $a(c_j)$ has the same meaning as discussed above with respect to Equation (2).

2.3.3.3 Publication Information:

Publication information such as, for example, the download URL, reference and citation, publishers, title and abstract, etc., are used in various embodiments of the Name Disambiguator to construct the aforementioned author name disambiguation system for publications.

In particular, the values of the four features noted above (i.e., download URL, reference and citation, publishers, title and abstract) are defined as weighted cosine similarities. In particular, $V_1 = \{(v_{1,1}, n_{1,1}), (v_{1,2}, v_{1,2}), \ldots, (v_{1,|V_1|}, n_{1,|V_1|})\}$ is used to denote the feature vector of $M_1$, where $n_{1,i}$ is the number of occurrence of $u_{1,i}$ for download URL, reference and citation, and publishers, and is the tf-idf values of each word for the title and abstract. Therefore, the feature value in this case, $f_{url}(M_1, M_2)$, for the link between MRU $M_1$ and MRU $M_2$ is computed as:

$$f_{url}(M_1, M_2) = \frac{\sum\limits_{v_{1,i} = v_{2,j}} n_{1,i} \cdot n_{2,j}}{\sqrt{\sum\limits_{v_{1,i}} n_{1,i}^2} \sqrt{\sum\limits_{v_{2,i}} n_{2,i}^2}} \quad \text{Equation (4)}$$

Figure 5:
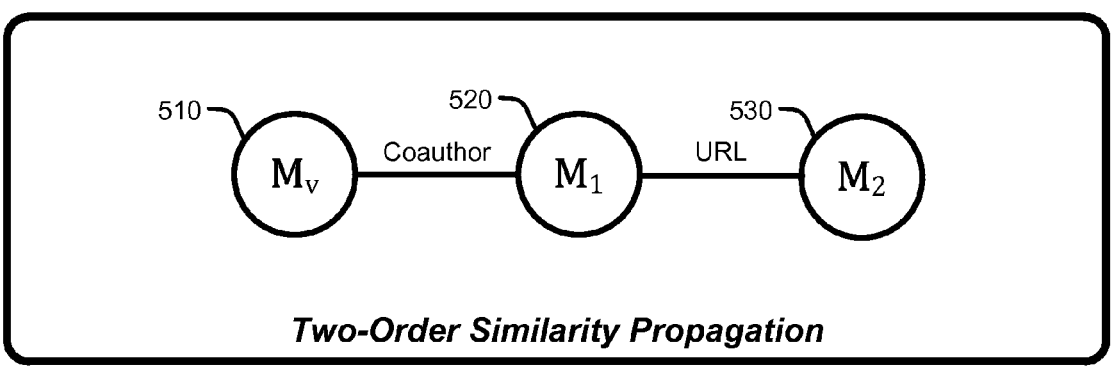
FIG. 5 provides an example of two-order similarity propagation for determining link strength between a verified MRU and two other MRUs, as described herein.

2.3.3.4 Similarity Propagation:

As detailed in the previous paragraphs, the previously described features were used to determine the direct, or one-order, similarity between a single verified MRU and a single unverified MRU. However, considering the example shown in FIG. 5, it has been observed that direct, or one-order, similarity may not be sufficient in all cases. For example, in FIG. 5, $M_v$ 510 is a verified MRU, and both $M_1$ 520 and $M_2$ 530 are unverified MRUs. In this example, both $M_v$ 510 and $M_1$ 520 have a strong coauthor similarity. Further, both $M_1$ 520 and $M_2$ 530 have a strong download URL similarity. However, $M_v$ 510 and $M_2$ 530 don't have a strong link based on one-order similarities. Therefore, if only the direct, or one-order, similarity were used, only $M_1$ 520 will be ranked to the top of the list of MRUs presented to the user, while $M_2$ 530 would only be ranked to the top in the next interaction. However, it is highly possible that both $M_1$ and $M_2$ are what the user want. Therefore, in various enhancements to the Name Disambiguator two MRUs may be ranked to the top of that list at the same time by considering similarity propagation.

In particular, in various embodiments, the Name Disambiguator uses a similarity propagation technique that allows the similarity between $M_1$ 520 and $M_2$ 530 to propagate to $M_v$ 510. Thus, the similarity between $M_v$ 510 and $M_2$ 530 will increase to the point where $M_2$ 530 may have a high ranking score along with $M_1$ 520. This similarity propagation is enabled by extending the one-order features to two-order features using techniques such as matrix multiplication. For example, if A is the coauthor similarity matrix and B is the download URL similarity matrix, then AB measures the coauthor-URL similarity between two MRUs. By considering such two-order features, the Name Disambiguator propagates the similarity to a two-order scope. In various embodiments, the Name Disambiguator also uses well-known SCAD SVM techniques to select informative features. For example, as used by Equation (5), Ind is a binary vector where the dimensions informative features have value 1. The other dimensions have value 0. Suppose the new feature vector after extension is f', then the similarity can be written as:

$$s(M_1, M_2) = \sum_{i=1}^{d} Ind_i \cdot w_i \cdot f_i' \quad \text{Equation (5)}$$

2.3.3.5 Model Learning:

The features discussed in the preceding paragraphs are used to construct the "feature vector" f. Then the similarity (distance) of two MRUs is measured as the linear combination of the features. Specifically, the similarity can be written as:

$$s(M_1, M_2) = w^T f \quad \text{Equation (6)}$$

There are variety of techniques that can be used to determine the weight vector w, such as manually setting all weights to 1 or learning from the training data by using logistic regression, SVM, Naive Bayes, etc. In a tested embodiment of the Name Disambiguator, linear SVM provides a good learning algorithm for this purpose since it is robust and can handle border cases well.

One challenge in using linear SVM is how to get the training data, which are a set of feature vectors. This problem is addressed by first manually setting the weight vector to some initial value that allows the system to work. This initial value serves as a baseline for labeling different cases. Then, the label process is simulated while the feature vectors are recorded in each user interaction as the training data. After training an SVM, the aforementioned bias is applied to the weight vectors w, such that the score for each test case is computed by Equation (7):

$$w^T f + b \quad \text{Equation (7)}$$

This score is then used as the similarity between two MRUs for ranking purposes.

Figure 6:
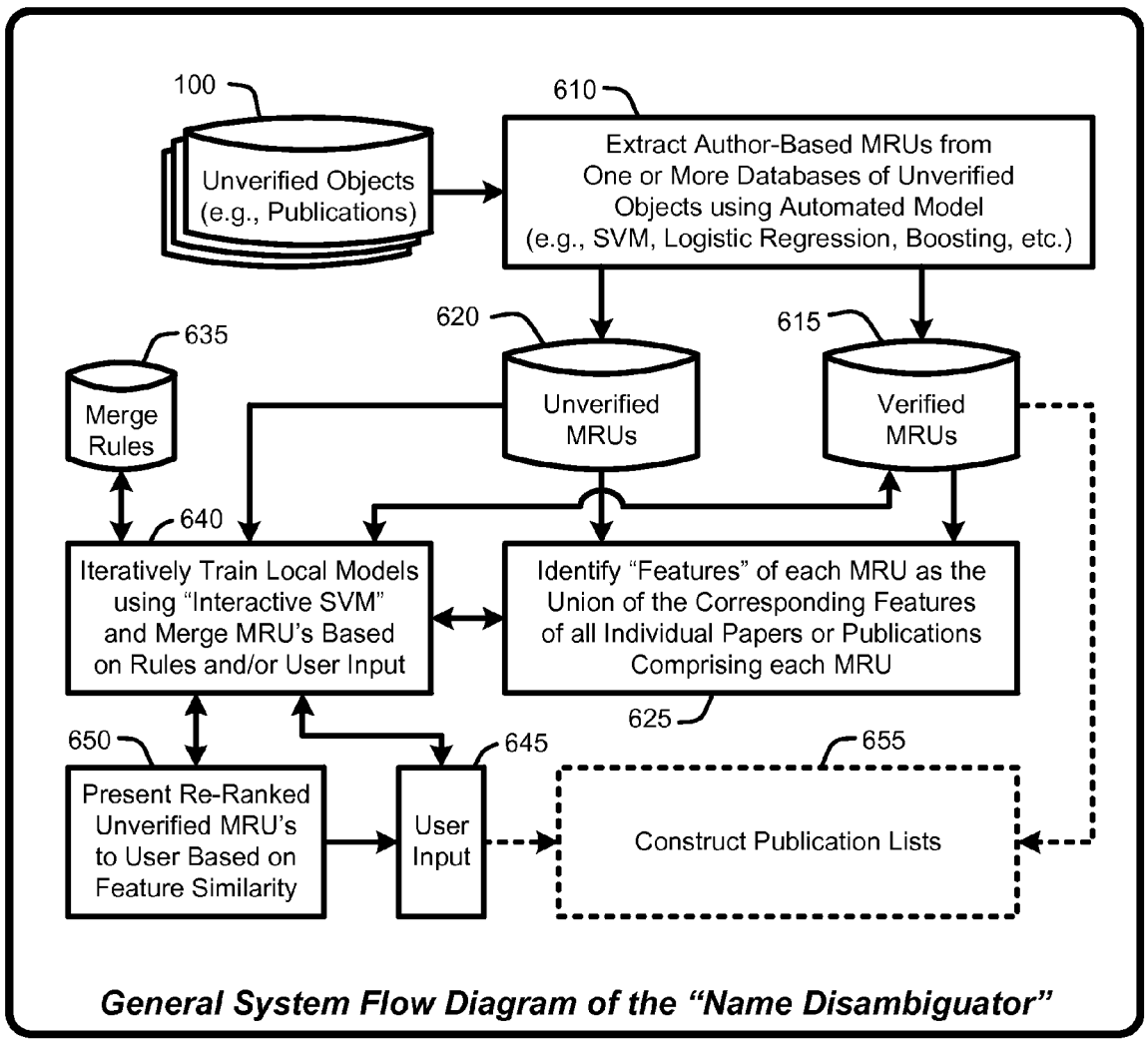
FIG. 6 illustrates a general system flow diagram that illustrates exemplary methods for implementing various embodiments of the Name Disambiguator, as described herein.

3.0 Operational Summary of the Name Disambiguator:

The processes described above with respect to FIG. 1 through FIG. 5 and in further view of the detailed description provided above in Sections 1 and 2 are illustrated by the general operational flow diagram of FIG. 6. In particular, FIG. 6 provides an exemplary operational flow diagram that summarizes the operation of some of the various embodiments of the Name Disambiguator. Note that FIG. 6 is not intended to be an exhaustive representation of all of the various embodiments of the Name Disambiguator described herein, and that the embodiments represented in FIG. 6 are provided only for purposes of explanation.

Further, it should be noted that any boxes and interconnections between boxes that are represented by broken or dashed lines in FIG. 6 represent optional or alternate embodiments of the Name Disambiguator described herein, and that any or all of these optional or alternate embodiments, as described below, may be used in combination with other alternate embodiments that are described throughout this document.

In general, as illustrated by FIG. 6, the Name Disambiguator begins operation by receiving one or more sets of unverified objects 100 (e.g., publications in the case of author name disambiguation for publications). These unverified objects 100 are then processed to extract 610 author-based MRUs from the unverified objects 100. More specifically, this processing is used to construct the global SVM that results in a clustering of the unverified objects 100 (e.g. publications) into a set of verified MRUs 615 and a set of unverified MRUs 620.

Once the initial global SVM has been trained and the verified MRUs 615 and the unverified MRUs 620 are available, these MRUs are further processed to identify 625 "features" of each MRU as the union of the corresponding features of all of the individual objects (e.g., publications) comprising each MRU.

Next, given the verified and unverified MRUs (615 and 620, respectively), and the "features" identified from those MRUs, a circular training and user input process is performed for one or more iterations. As discussed in detail above, in various embodiments, this circular training process trains 640 local models (for each author or entity) using "interactive SVM" and merges MRUs based on predefined feature-based merge rules 640 and user input 645.

With each iteration, as MRUs are merged, author lists for corresponding publications become more complete. Thus, in various embodiments, publication lists or the like are constructed 655 from the verified MRUs 620 in response to user input 645, such as a user query or search for one or more particular authors.

Figure 7:
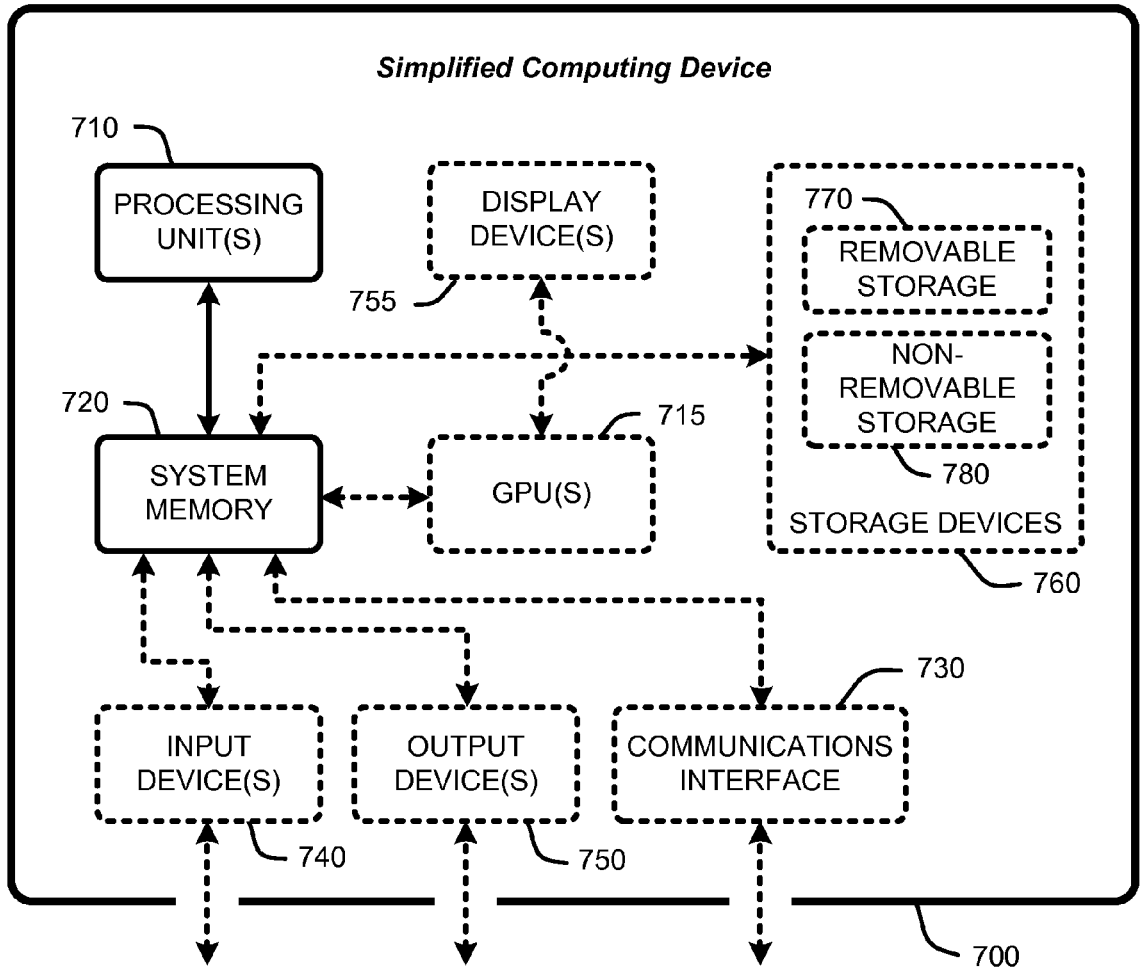
FIG. 7 is a general system diagram depicting a simplified general-purpose computing device having simplified computing and I/O capabilities for use in implementing various embodiments of the Name Disambiguator, as described herein.

4.0 Exemplary Operating Environments:

The Name Disambiguator described herein is operational within numerous types of general purpose or special purpose computing system environments or configurations. FIG. 7 illustrates a simplified example of a general-purpose computer system on which various embodiments and elements of the Name Disambiguator, as described herein, may be implemented. It should be noted that any boxes that are represented by broken or dashed lines in FIG. 7 represent alternate embodiments of the simplified computing device, and that any or all of these alternate embodiments, as described below, may be used in combination with other alternate embodiments that are described throughout this document.

For example, FIG. 7 shows a general system diagram showing a simplified computing device 700. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, mini-computers, mainframe computers, audio or video media players, etc.

To allow a device to implement the Name Disambiguator, the device should have a sufficient computational capability and system memory to enable basic computational operations. In particular, as illustrated by FIG. 7, the computational capability is generally illustrated by one or more processing unit(s) 710, and may also include one or more GPUs 715, either or both in communication with system memory 720. Note that that the processing unit(s) 710 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 7 may also include other components, such as, for example, a communications interface 730. The simplified computing device of FIG. 7 may also include one or more conventional computer input devices 740 (e.g., pointing devices, keyboards, audio input devices, video input devices, haptic input devices, devices for receiving wired or wireless data transmissions, etc.). The simplified computing device of FIG. 7 may also include other optional components, such as, for example, one or more conventional computer output devices 750 (e.g., display device(s) 755, audio output devices, video output devices, devices for transmitting wired or wireless data transmissions, etc.). Note that typical communications interfaces 730, input devices 740, output devices 750, and storage devices 760 for general-purpose computers are well known to those skilled in the art, and will not be described in detail herein.

The simplified computing device of FIG. 7 may also include a variety of computer readable media. Computer readable media can be any available media that can be accessed by computing device 700 via storage devices 760 and includes both volatile and nonvolatile media that is either removable 770 and/or non-removable 780, for storage of information such as computer-readable or computer-executable instructions, data structures, applications, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, applications, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, applications, software, programs, and/or computer program products embodying the some or all of the various embodiments of the Name Disambiguator described herein, or portions thereof, may be stored, received, transmitted, or read from any desired combination of computer or machine readable media or storage devices and communication media in the form of computer executable instructions or other data structures.

Finally, the Name Disambiguator described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the Name Disambiguator has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Name Disambiguator. It is intended that the scope of the invention be limited not by this detailed description, but rather by the claims appended hereto.

What is claimed is:

1. A method for disambiguating entity names for objects, comprising using a computing device to perform steps for:
receiving one or more sets of objects;
extracting one or more features from each objects;
using the extracted features for training a global support vector machine (SVM) model that clusters all of the objects into a global data set comprising two types of maximum recognition units (MRUs) including "verified MRUs" and "unverified MRUs", and wherein only the verified MRUs have accurately known entities associated with those objects;
identifying features of each MRU as the union of the corresponding features of all of the individual objects comprising each MRU;
iteratively training a separate local model for each different entity from the global data set and the corresponding features of each MRU using an "interactive SVM" modeling process that includes:
presenting a ranked list of MRUs to a user based on a user search for a particular entity,
receiving user selection of zero or more MRUs from the ranked list that have an entity matching the user search,
merging any selected MRUs into a verified MRU having an accurately known entity matching the user search,
merging zero or more additional MRUs where such mergers are in accordance with a set of predefined feature-based merge rules, and
retraining the separate local model for each different entity based on the user input and the features associated with any merged MRUs.

2. The method of claim 1 further comprising steps for generating sets of relevant objects corresponding to each entity from the corresponding verified MRUs.

3. The method of claim 1 wherein the set of objects are publications and the entities include one or more authors and zero or more coauthors.

4. The method of claim 3 further comprising constructing an author-based publication list corresponding to the user search from the corresponding verified MRU.

5. The method of claim 1 wherein the set of predefined feature-based merge rules includes a similarity propagation rule for merging two similar unverified MRUs with a verified MRU based on a strong similarity between the two unverified MRUs and a strong similarity between one of the unverified MRUs and the verified MRU.

6. The method of claim 1 wherein the set of predefined feature-based merge rules includes a rule for merging an unverified MRU with a verified MRU wherein if the unverified MRU contains two coauthor names which appear in the verified MRU, then that unverified MRU is merged with that verified MRU.

7. The method of claim 1 wherein the set of predefined feature-based merge rules includes a rule for merging an unverified MRU with a verified MRU wherein if the unverified MRU contains one author name which appears in the verified MRU, that unverified MRU will be merged with the verified MRU if a similarity of other features identified in each of those MRUs exceed a predetermined threshold.

8. The method of claim 1 wherein the global support vector machine clusters objects sharing two common entity names into the same MRU.

9. The method of claim 1 wherein the global support vector machine clusters objects having similar entity names that also have the same email address as a feature into the same MRU.

10. The method of claim 1 wherein the global support vector machine clusters objects having similar entity names that also have the same homepage address as a feature into the same MRU.

11. A system for disambiguating entity names for objects, comprising:
a device for receiving one or more sets of objects, each objects having one or more predefined features;
a device for training an automated model that clusters all of the objects into maximum recognition units (MRUs)

including "verified MRUs" and "unverified MRUs", and wherein only the verified MRUs have accurately known entities associated with those objects;

a device for identifying features of each MRU as the union of the corresponding features of all of the individual objects comprising each MRU; and a device for iteratively merging one or more unverified MRUs into verified MRUs by:
presenting a ranked list of MRUs to a user based on a user search for a particular entity,
receiving user selection of zero or more MRUs from the ranked list that have an entity matching the user search, and
merging any selected MRUs into a verified MRU having an accurately known entity matching the user search.

12. The system of claim 11 wherein the device for iteratively merging one or more unverified MRUs into verified MRUs automatically merges one or more unverified MRUs into a verified MRU where such mergers are in accordance with a set of predefined feature-based merge rules.

13. The system of claim 12 wherein the feature-based merge rules includes a similarity propagation rule for merging two similar unverified MRUs with a verified MRU based on a strong similarity between the two unverified MRUs and a strong similarity between one of those unverified MRUs and the verified MRU.

14. The system of claim 12 wherein the feature-based merge rules includes a rule for merging an unverified MRU with a verified MRU wherein if the unverified MRU contains two coauthor names that also appear in the verified MRU, then that unverified MRU is merged with that verified MRU.

15. The system of claim 12 wherein the feature-based merge rules includes a rule for merging an unverified MRU with a verified MRU wherein if the unverified MRU contains one entity name which appears in the verified MRU, that unverified MRU will be merged with the verified MRU if a similarity of other features identified in each of those MRUs exceed a predetermined threshold.

16. The system of claim 11 wherein the set of objects are publications and the entities include one or more authors and zero or more coauthors, and further comprising a device for constructing an author-based publication list corresponding to the user search from the corresponding verified MRU.

17. The system of claim 11 wherein the automated model includes clustering rules including one or more of:
clustering objects sharing two common entity names into the same MRU;
clustering objects having similar entity names that also have the same email address as a feature into the same MRU; and
clustering objects having similar entity names that also have the same homepage address as a feature into the same MRU.

18. A computer-readable medium having computer executable instructions stored therein for automatically constructing author-based publication lists from one or more sets of publications, said instructions causing a computing device to:
extract one or more features from each publication in one or more sets of publications;
train an automated global model to accurately cluster all of the publications into maximum recognition units (MRUs) including "verified MRUs" and "unverified MRUs", and wherein each verified MRU has an accurately known author associated with the publications clustered into the corresponding verified MRU;
identifying features of each MRU as the union of the corresponding features of all of the individual publications comprising each MRU;
iteratively training a separate automated local model for each different author based on the features of each MRU using an interactive modeling process that includes:
presenting a ranked list of MRUs to a user based on a user search for a particular author,
receiving user selection of zero or more MRUs from the ranked list that have an author matching the user search,
merging any selected MRUs into a verified MRU having an accurately known author matching the user search,
merging zero or more additional MRUs where such mergers are in accordance with a set of predefined feature-based merge rules, and
retraining the separate local model for each different author based on the user input and the features associated with any merged MRUs; and
constructing an author-based publication list corresponding to the user search from the corresponding verified MRU.

19. The computer-readable medium of claim 18 wherein the automated global model includes clustering rules including one or more of:
clustering objects sharing two common author names into the same MRU;
clustering objects having similar author names that also have the same email address as a feature into the same MRU; and
clustering objects having similar author names that also have the same homepage address as a feature into the same MRU.

20. The computer-readable medium of claim 18 wherein the set of predefined feature-based merge rules includes one or more of:
a similarity propagation rule for merging two similar unverified MRUs with a verified MRU based on a strong similarity between the two unverified MRUs and a strong similarity between one of the unverified MRUs and the verified MRU;
a rule for merging an unverified MRU with a verified MRU wherein if the unverified MRU contains two coauthor names which appear in the verified MRU, then that unverified MRU is merged with that verified MRU; and
a rule for merging an unverified MRU with a verified MRU wherein if the unverified MRU contains one author name which appears in the verified MRU, that unverified MRU will be merged with the verified MRU if a similarity of other features identified in each of those MRUs exceed a predetermined threshold.

* * * * *